United States Patent [19]

Quinn et al.

[11] 4,205,907
[45] Jun. 3, 1980

[54] CALCULATOR FOR ELECTRONIC FLASH

[75] Inventors: Peter T. Quinn; Stephen Blecher, both of Littleton, Colo.

[73] Assignee: Rollei of America, Inc., Littleton, Colo.

[21] Appl. No.: 24,901

[22] Filed: Mar. 29, 1979

[51] Int. Cl.² .................. G03B 15/02; G06C 3/00
[52] U.S. Cl. .............................. 354/32; 354/59;
354/35; 354/127; 235/64.7; 362/4; 362/276
[58] Field of Search .............. 354/22, 23 R, 32, 35,
354/42, 49, 59, 126–128, 56, 289; 235/64.7;
356/225, 234; 362/4, 5, 16–18, 276

[56] References Cited

U.S. PATENT DOCUMENTS

| 3,769,888 | 11/1973 | Quinn | 235/64.7 X |
| 3,967,106 | 6/1976 | Chen | 354/128 X |
| 4,065,777 | 12/1977 | Maitani et al. | 354/23 R |
| 4,067,024 | 1/1978 | Quinn | 235/64.7 |

Primary Examiner—L. T. Hix
Assistant Examiner—William B. Perkey
Attorney, Agent, or Firm—Allegretti, Newitt, Witcoff & McAndrews

[57] ABSTRACT

A calculator device for an electronic photoflash system in which a photosensor receives light reflected back from the scene being photographed and generates an electrical signal for providing termination of the flash upon sensing a predetermined amount of light. The light received from the scene is reflected from either of two surfaces having different light reflectivities, prior to receipt by the photosensor. The pair of surfaces are carried by a slidable member and selectively positionable at the point of light reflection in accordance with the selection of indicia carried on the front side of the member, by movement of the same by the photographer.

9 Claims, 3 Drawing Figures

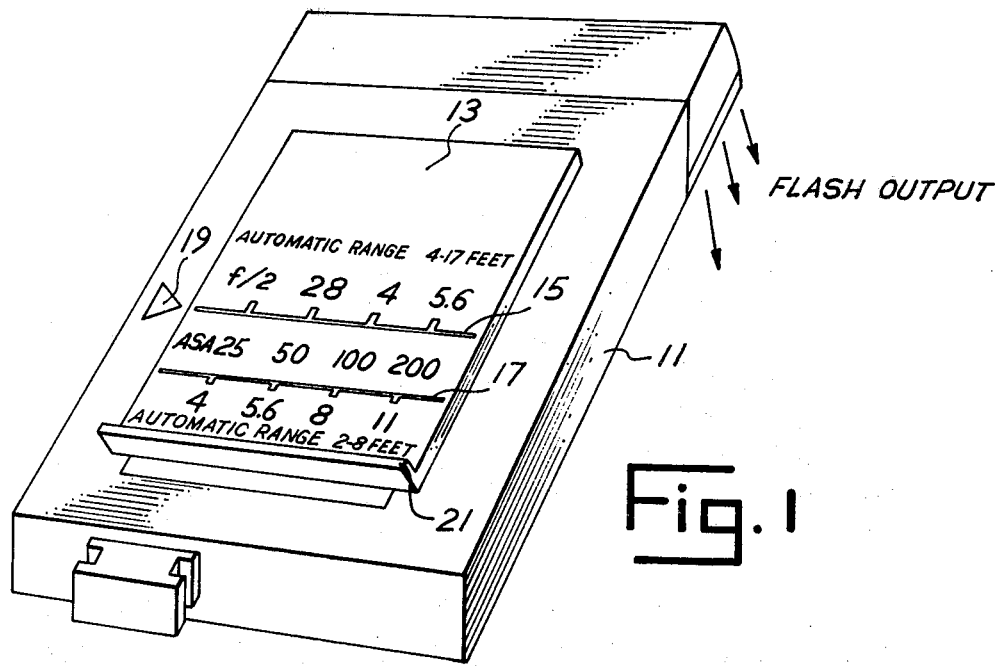
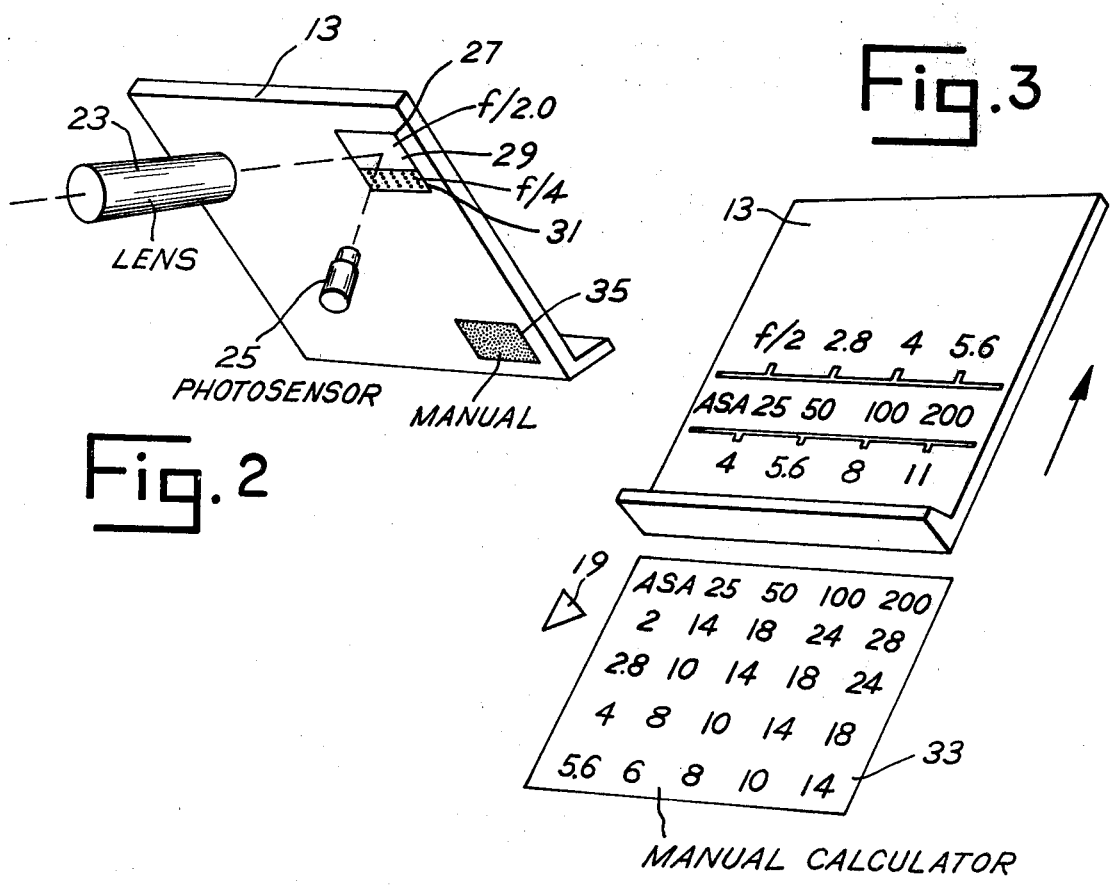

CALCULATOR FOR ELECTRONIC FLASH

BACKGROUND OF THE INVENTION

The present invention relates to automatic photoflash calculator systems and more particularly to a calculator apparatus which changes the sensitivity of the photoflash light sensor in accordance with the photographer's use of the calculator.

Automatic photoflash systems are generally well known in the art. Basically, a light producing means is selectively actuated to furnish light for the illumination of a scene to be photographed. A light sensing means senses light received back from the scene and, upon receipt of a predetermined quantity of light, generates a quench signal which is effective to terminate the light being produced.

In order to provide the photographer with greater flexibility in selection of f-stop/distance settings with any given ASA speed of film being used in an associated camera, the art has suggested controlling the amount of light output produced by the flash by using a light attenuator in front of the device's light sensing means. See for example, U.S. Pat. No. 3,769,888 issued to one of the present inventors on November 6, 1973, and assigned to the same assignee as the present invention.

Although such calculators operate accurately, they are found to be generally complex in their structure and operation, making both their manufacture and ultimate use moderately sophisticated. The provision of a more simplified structure permitting easy operation would be highly welcomed.

SUMMARY OF THE INVENTION

It is, therefore, an object of the present invention to provide a simplified calculator structure which permits flexibility in the selection of f-stop/distance settings.

It is another object of this invention to provide an automatic photoflash calculator which is easy to operate.

It is a further object of the present invention to provide such a calculator which is operable in both an automatic and manual mode.

These and other objects of the invention are accomplished in reflecting light received back from the photographed scene, into the photosensor which effectively controls the duration of the flash. The quantity of light reflected is selectable by the operator in conjunction with the operator's selection of values of the photographic variables of the photographic system. A manual mode of photoflash operation may be provided by reflecting the received light back toward the scene and away from the photosensor, in response to the photographer's selection of the manual mode on the calculator.

BRIEF DESCRIPTION OF THE DRAWINGS

FIG. 1 is a perspective view of a preferred calculator embodiment of the present invention.

FIG. 2 is a perspective view of the lens and photosensor arrangement of the calculator embodiment of FIG. 1.

FIG. 3 is a perspective view of the calculator slider in the manual mode of the calculator embodiment of FIG. 1.

DESCRIPTION OF THE PREFERRED EMBODIMENT

Referring to FIG. 1, an electronic photoflash calculator device 11 operates for providing an electronic flash output upon activation of an associated camera (not shown) by a photographer taking a picture of a desired subject or scene. The amount of light required for exposing the film of the associated camera is dictated by the ASA speed of the film; whereas the amount of light reaching the film to expose the same is controlled by the camera f/stop setting and the flash of light reflected back from the subject.

Calculator device 11 includes a rectangular-shaped member 13 slidably mounted with respect to the housing of device 11 for movement in a relatively vertical direction, as viewed in FIG. 1, for aligning one of two horizontal calculating lines 15, 17 with an arrow pointer 19 imprinted on the housing. Member 13 cludes an integrally formed outset portion 21 upstanding from the lower extremity of member 13 for use by the operator to aid in manually sliding member 13 relative to arrow 19. As will suggest itself, member 13 may be constructed for movement in a direction other than vertical with respect to the housing, e.g., horizontal or rotary.

Each of the calculating lines 15, 17 is associated with a plurality of indicia positioned about either side of the line and set at equal distances therealong. The indicia provides visual instructions to the operator for alignment of either of lines 15, 17 and arrow 19, in order to properly set the flash device to an automatic operation according to one of two different calculating lines. The indicia further instructs the operator as to which f/stop setting is to be used in accordance with the particular camera ASA film being used.

Upper line 15 is bounded above by four (4) horizontally-spaced numerals representative of f/stop camera settings, f/2, f/2.8, f/4 and 4/5.6. Below line 15 are four (4) horizontally-spaced numerals representative of ASA camera film speeds, 25, 50, 100, 200, with each ASA numeral associated with the corresponding f/stop numeral positioned directly above line 15. Lower line 17 is bounded above by the four ASA numerals and bounded below by four (4) horizontally-spaced f-numbers f/4, f/5.6, f/8 and f/11, each associated with the corresponding ASA number positioned directly above line 17.

Printed above the f/stop settings of the upper line 15 is line identification information for explanation to the operator that the upper line portion of the calculator is for an automatic flash operation of a range of 4–17 feet. This tells the operator that where the desired subject to be photographed is situated four (4) to seventeen (17) feet from the camera, the automatic flash may be utilized according to the certain f/stop settings of line 15 with its corresponding ASA film speed. Thus, assuming the subject to be 4–17 feet away, the particular ASA film being used by the photographer will yield the necessary f/stop camera setting according to the f/stop visually indicated directly above the ASA number.

Line 17, on the other hand, includes associated line identification information printed below its correspondence f/stop numerals for explanation to the operator that lower line 17 of the calculator is for an automatic flash operation of a range of 2–8 feet. This tells the operator that where the desired subject to be photographed is situated from two (2) feet to eight (8) feet from the camera, the automatic flash may be utilized according to certain f/stop settings with corresponding ASA film speeds, as described with respect to line 15.

Referring to FIG. 2, the backside of member 13 is illustrated with respect to a lens 23 of the flash device, which receives light from the scene being photographed and directs the light to a photosensor device 25 by reflection of the light off the backside of member 13. Photosensor device 25 responds to the intensity of light it receives and produces an output current having a magnitude indicative of the intensity of light received from the photographed scene. The intensity information carried by the output current is processed by the flash device for automatic termination of the flash after a predetermined quantity of light has been received by sensor 25.

Lens 23 is secured to the housing of the calculator for viewing a specified field of view in front of the flash device and is designed to gather as much light as possible along its view direction. The lens 23 and photosensor device 25 are relatively positioned so that the light received through lens 23 is directed off the backside of member 13 for reflection back into device 25.

A reflector member 27 is positioned on the backside of member 13 at the point of light reflection for controlling the quantity of light reflected back into photosensor 25. Reflector member 27 is formed of two (2) surfaces 29, 31 set flush to one another along a horizontal line which lies between the two lines 15, 17. Surfaces 29, 31 are formed of surfaces of different light reflectivity such that surface 31 which has a low reflectivity requires more light from lens 23 to produce the same magnitude in current from photosensor 25 as does the light reflected from surface 29.

Reflective surfaces 29, 31 are positioned at the point of reflection according to the alignment of calculation line 15 or 17 with arrow 19. A detent slotting arrangement may be utilized for accurately locating member 13 in its desired alignment position.

As indicated in FIG. 2, reflective surface 29 is denominated f/stop 2 and reflective surface 31 is denominated f/stop 4. Thus, the difference in the relative reflectivity of surfaces 29, 31 is established as though a change in two (2) f/stop positions of the camera lens has occurred, i.e., a change in four (4) times the light reaching the film. Thus, the f/stop numerals along lines 15, 17 are laterally displaced from each other by two (2) f/stop positions.

Referring to FIG. 3, member 11 is slidable to a fully extended upward position which reveals a manual calculator display 33 printed at the normal viewing location. The display is in matrix form having a horizontal axis of ASA film speeds with each film speed heading a column, and having a vertical axis of f/stop numbers with each f/stop number heading a row. The row-column matrix positions contain distance values in feet. Thus, where a particular ASA film is being used, the distance values in the column headed by the ASA number corresponds to proper f/stop number for the particular distance lying between the subject and the camera.

As shown in FIG. 2, a manual reflective surface 35 is positioned on the backside of member 11 in a position to move into the reflective point of the light from lens 23 to photosensor 25, when member 11 is moved into its fully extended upward (manual) position. Manual reflective surface 33 is a highly polished black surface (black mirror) disposed perpendicular to the optical axis when at the reflective point for reflecting the light from lens 23 back out through lens 23. Because the surface 33 is black, some light will be absorbed. Thus, sensor 25 will receive no light, allowing the flash device to expend its total energy during each flash.

What is claimed is:

1. A calculator device for use with a photographic system comprising:
   lens means for gathering light along a general view direction and passing received light along a first optical path;
   photosensor means responsive to received light along a second optical path, for producing an output signal having a magnitude related to the intensity of light received, said photosensor means positioned relative to said lens means for intersecting of said first and said second optical paths;
   reflection means operable at the point of intersection of said first and second paths for reflecting light from said lens means to said photosensor means, said reflection means operable for controlling the quantity of light reflected; and
   calculator means permitting operator selection of a photographic variable of the photographic system, said calculator means operating said reflection means for controlling the quantity of light reflected in accordance with the selected value of said photographic variable.

2. A calculator device according to claim 1 wherein said reflection means includes a plurality of surfaces having different reflectivities, each of said surfaces positionable at said point of intersection.

3. A calculator device according to claim 2 wherein said calculator means positions a said surface at said point of intersection in accordance with the selected value of said photographic variable.

4. Apparatus according to claim 3 wherein said calculator means includes a plurality of indicia each representing a value of said photographic variable and each indicia physically fixed with respect to a said surface; and alignment means including a reference pointer, for aligning a said indicia with said pointer for positioning the aligned indicia's fixed surface at said point of intersection.

5. A calculator device according to claim 1 wherein said calculator means includes selection means for indicating a value of a second photographic variable dependent upon a third photographic variable in conjunction with the selected photographic variable.

6. A calculator device according to claim 5 wherein said first named photographic variable is an indication of the subject-to-camera distance, said second photographic variable is the film speed of the light sensitive film used in the camera and said third photographic variable is the f-stop setting of the camera.

7. A calculator device according to claim 1, wherein said reflection means is further operable for reflecting light from said lens means back along said first optical path and out through said lens means, substantially preventing light from being received by said photosensor means, and wherein said calculator means further permits operator selection means to reflect light from said lens means back out through said lens means.

8. A calculator device according to claim 7 wherein said reflection means includes a surface positionable perpendicular to said first optical path for reflecting light from said lens means back along said first optical path and out through said lens means.

9. A calculator device according to claim 8 wherein said surface is a black mirror.

* * * * *